US 7,509,486 B1

(12) United States Patent
Chin et al.

(10) Patent No.: US 7,509,486 B1
(45) Date of Patent: Mar. 24, 2009

(54) ENCRYPTION PROCESSOR FOR PERFORMING ACCELERATED COMPUTATIONS TO ESTABLISH SECURE NETWORK SESSIONS CONNECTIONS

(75) Inventors: David K. Chin, Mountain View, CA (US); Vojin G. Oklobdzija, Berkeley, CA (US); Aamir Farooqui, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 484 days.

(21) Appl. No.: 09/611,809

(22) Filed: Jul. 7, 2000

Related U.S. Application Data (60) Provisional application No. 60/142,891, filed on Jul. 8, 1999.

(51) Int. Cl.
*H04L 29/00* (2006.01)
*H04L 9/00* (2006.01)

(52) U.S. Cl. .................. 713/151; 713/168; 713/190; 708/490; 708/491; 708/492; 708/622; 380/255

(58) Field of Classification Search ................ 708/491, 708/622, 490, 492; 370/389; 380/265, 255; 713/151, 168, 190
See application file for complete search history.

(56) References Cited

U.S. PATENT DOCUMENTS

| | | | | |
|---|---|---|---|---|
| 3,665,411 | A * | 5/1972 | O'Connor | 712/222 |
| 4,507,728 | A * | 3/1985 | Sakamoto et al. | 712/1 |
| 5,227,987 | A * | 7/1993 | Imazawa et al. | 708/7 |
| 5,870,596 | A * | 2/1999 | Yoshida | 712/225 |
| 5,953,241 | A * | 9/1999 | Hansen et al. | 708/501 |
| 6,064,740 | A * | 5/2000 | Curiger et al. | 380/265 |
| 6,209,016 | B1 * | 3/2001 | Hobson et al. | 708/491 |
| 6,223,198 | B1 * | 4/2001 | Oberman et al. | 708/620 |
| 6,237,016 | B1 * | 5/2001 | Fischer et al. | 708/622 |
| 6,282,556 | B1 * | 8/2001 | Chehrazi et al. | 708/521 |
| 6,289,462 | B1 * | 9/2001 | McNabb et al. | 726/21 |
| 6,289,465 | B1 * | 9/2001 | Kuemerle | 713/300 |
| 6,351,760 | B1 * | 2/2002 | Shankar et al. | 708/654 |
| 6,370,558 | B1 * | 4/2002 | Guttag et al. | 708/603 |

(Continued)

FOREIGN PATENT DOCUMENTS

EP          601907 A2 *   6/1994

OTHER PUBLICATIONS

D. Villeger and V. G. Oklobdzija, "Analysis Of Booth Encoding Efficiency In Parallel Multipliers Using Compressors For Reduction Of Partial Products", *Proceedings of the 27th Asilomar Conference on Signals, Systems and Computers*, pp. 781-784, 1993.

(Continued)

*Primary Examiner*—Carl Colin
(74) *Attorney, Agent, or Firm*—Sterne Kessler Goldstein & Fox, p.l.l.c.

(57) ABSTRACT

Methods and apparatus for an encryption processor for performing accelerated computations to establish secure network sessions. The encryption processor includes an execution unit and a decode unit. The execution unit is configured to execute Montgomery operations and including at least one adder and at least two multipliers. The decode unit is configured to determine if a square operation or a product operation needs to be performed and to issue the appropriate instructions so that certain multiply and/or addition operations are performed in parallel in the execution unit while performing either the Montgomery square or Montgomery product operation.

24 Claims, 7 Drawing Sheets

U.S. PATENT DOCUMENTS

| | | | |
|---|---|---|---|
| 6,370,559 B1* | 4/2002 | Hoffman | 708/625 |
| 6,385,634 B1* | 5/2002 | Peleg et al. | 708/490 |
| 6,397,238 B2* | 5/2002 | Oberman et al. | 708/497 |
| 6,434,699 B1* | 8/2002 | Jones et al. | 713/168 |
| 6,470,370 B2* | 10/2002 | Fischer et al. | 708/622 |
| 6,633,563 B1* | 10/2003 | Lin et al. | 370/389 |
| 7,137,143 B2* | 11/2006 | Chawla et al. | 726/12 |
| 2002/0039420 A1* | 4/2002 | Shacham et al. | 380/277 |

OTHER PUBLICATIONS

V. G. Oklobdzija and D. Villeger, "Improving Multiplier Design By Using Improved Column Compression Tree And Optimized Final Adder In CMOS Technology", *IEEE Transactions on VLSI Systems*, vol. 3, No. 2, Jun. 1995, 25 pages.

V. G. Oklobdzija, D. Villeger, and S. S. Liu, "A Method For Speed Optimized Partial Product Reduction And Generation Of Fast Parallel Multipliers Using An Algorithmic Approach", *IEEE Transactions on Computers*, vol. 45, No. 3, Mar. 1996.

P. Stelling, V. G. Oklobdzija, "Design Strategies for Optimal Hybrid Final Adders in a Parallel Multiplier", *special issue on VLSI Arithmetic*, Journal of VLSI Signal Processing, Kluwer Academic Publishers, vol. 14, No. 3, Dec. 1996.

P. Stelling, V. G. Oklobdzija, "Achieving Multiply-Accumulate Operation in the Multiply Time", *Thirteenth International Symposium on Computer Arithmetic*, Pacific Grove, California, Jul. 5-9, 1997.

C. Martel, V. G. Oklobdzija, P. Stelling, "Design Strategies For Optimal Multiplier Circuits" *IEEE Transaction on Computers*, in press, vol. 47, No. 3, Mar. 1998.

A. A. Farooqui, V. G. Oklobdzija, "General Data-Path Organization of a MAC unit for VLSI Implementation of DSP Processors", *1998 IEEE International Symposium on Circuits and Systems*, May 31-Jun. 3, 1998, Monterey, California.

http:///www.bluesteelnet,com/product.html.

http://isg.rainbow.com/products/cs_1.html.

D. Villeger and V. G. Oklobdzija, "Analysis Of Booth Encoding Efficiency In Parallel Multipliers Using Compressors For Reduction Of Partial Products", *Proceedings of the 27th Asilomar Conference on Signals, Systems and Computers*, pp. 781-784, 1993.

V. G. Oklobdzija and D. Villeger, "Improving Multiplier Design By Using Improved Column Compression Tree And Optimized Final Adder In CMOS Technology", *IEEE Transactions on VLSI Systems*, vol. 3, No. 2, Jun. 1995, 25 pages.

V. G. Oklobdzija, D. Villeger, and S. S. Liu, "A Method For Speed Optimized Partial Product Reduction And Generation Of Fast Parallel Multipliers Using An Algorithmic Approach", *IEEE Transactions on Computers*, vol. 45, No. 3, Mar. 1996.

P. Stelling, V. G. Oklobdzija, "Design Strategies for Optimal Hybrid Final Adders in a Parallel Multiplier", *special issue on VLSI Arithmetic*, Journal of VLSI Signal Processing, Kluwer Academic Publishers, vol. 14, No. 3, Dec. 1996.

P. Stelling, V. G. Oklobdzija, "Achieving Multiply-Accumulate Operation in the Multiply Time", *Thirteenth International Symposium on Computer Arithmetic*, Pacific Grove, California, Jul. 5-9, 1997.

C. Martel, V. G. Oklobdzija, P. Stelling, "Design Strategies For Optimal Multiplier Circuits" *IEEE Transaction on Computers*, in press, vol. 47, No. 3, Mar. 1998.

A. A. Farooqui, V. G. Oklobdzija, "General Data-Path Organization of a MAC unit for VLSI Implementation of DSP Processors", *1998 IEEE International Symposium on Circuits and Systems*, May 31-Jun. 3, 1998, Monterey, California.

* cited by examiner

Product Operation

| Instruction | Description |
|---|---|
| Cycle One: MULT R1 $a_1,b_1$ $a_0,b_0$ | $a_1 b_1$ and $a_0 b_0$ are simultaneously multiplied and the result is stored in Register R1 |
| Cycle Two: MAC R2 ($a_1, b_0$), R1 | $a_1 b_0$ are multiplied and the product is added with the contents of R1 and stored in R2 |
| Cycle Three: MAC R3 ($b_1, a_0$), R2 | $a_0 b_1$ are multiplied and the product is added with the contents of R2 and stored in R3 |

Square Operation

| | Instruction | Description |
|---|---|---|
| Cycle One | MULT R1 $a_1, a_1$ $a_0, a_0$ | $a_1 a_1$ and $a_0 a_0$ are multiplied and stored in Register R1 |
| Cycle Two | MAC 2X R2 ($a_1$, $a_0$), R1 | $a_1 a_0$ are multiplied and shifted by one and then added to the contents of R1. The result is stored in R2 |

$$\begin{array}{r} a_1\ a_0 \\ a_1\ a_0 \\ \hline a_1\ a_1\ a_0\ a_0 \\ 2a_1\ a_0 \end{array}$$

ENCRYPTION PROCESSOR FOR PERFORMING ACCELERATED COMPUTATIONS TO ESTABLISH SECURE NETWORK SESSIONS CONNECTIONS

RELATED APPLICATIONS

This application claims the benefit of priority under 35 USC 119 § 119(e) of provisional application Ser. No. 60/142,891 entitled Implementations for Cryptography Acceleration filed Jul. 8, 1999 and incorporated by reference herein for all purposes.

BACKGROUND OF THE INVENTION

1. Field of Invention

The present invention relates to network security, and more particularly, to an encryption processor for performing accelerated computations to establish secure network sessions.

2. Description of the Related Art

For Virtual Private Networks (VPN) and E-commerce applications, security is the number one concern. For VPN applications, the commonly used security protocol is Internet Protocol Security (IPSec). For E-commerce applications, the security protocol deployed is Secure Socket Layer (SSL). SSL is embedded in every web browser. Before an SSL session can be established, symmetrical keys need to be established at both the client and server. This is accomplished by the use of a public key operation by the client and a private key operation by the server. In other words, the client uses the public key of the server to encrypt a message which is then sent to the server. The message is then decrypted by the server using its own private key (only the server knows its own private key). Once the message is decrypted, both the client and server have the same message to generate a symmetrical key. They can use the symmetrical key to encrypt/decrypt any messages transmitted and received between the client and server. Thus a private SSL session is established.

The IPSec session keys are typically established using Diffie-Hellman (DH) algorithm in the Internet Key Exchange (IFE) protocol. IKE also utilizes RSA and Digital Signature Algorithm (DSA) algorithms for Public Key Infra-structure (PKI). The algorithms used in SSL are RSA, DH, and DSA. RSA Is by far the most used algorithm in SSL protocol because its simplicity and its easy integration with PKI. However DH and DSA are also occasionally used in SSL. DSA is the algorithm favored by government agencies. Common to all three algorithms is the time-consuming modular exponentiation ($C=M^e \mod N$) operation. One problem with the aforementioned security protocols is the time involved in computing the modular exponentiation ($C=M^e \mod N$) operation. Typically, the values of C and N are both 1024 bits wide. The value of exponent e can also be as large as 1024 bits wide. For example, the RSA private key decryption used by a server commonly has an exponent 1024 bits wide for stronger security. This means the calculation is extremely computation intensive, often resulting in relatively long delays before a secure connection is established. This problem is further compounded by the fact that the computation is typically performed by 32 or 64 bit microprocessor(s) in a server and not a dedicated device.

The Montgomery method for modular exponentiation is a technique that provides efficient implementation of modular multiplication without explicitly carrying out the classic modular reduction step. A modular multiplication usually consists of two operations: (1) multiplication and (2) modular reduction. The classic modular reduction step typically involves long division operation. For digital systems, division is a tedious operation and takes many clock cycles to complete. Montgomery method effectively removes many division operations required in the classic modular exponentiation operation and speeds up the total execution time for modular exponentiation. Montgomery method converts the classic modular exponentiation operation to a different residue space (the step is called Montgomery reduction operation). If a residue space of $2^n$, where n is the length of modulus N in base 2, is chosen, the subsequent modular multiplication operations embedded in the modular exponentiation operation become two multi-precision multiplication operations followed by one right shift operation. For more information on the Montgomery method, see P. Montgomery, "Modular Multiplication Without Trial Division", Mathematics of Computation, 44 (1985), pp 519-521.

Although helpful, the use of Montgomery mathematics is still too slow when implemented by a standard microprocessor in a server. This is particularly true at a busy web site where many Internet users are seeking to establish secure communications with the server because the SSL related computations consume an inordinate amount of the microprocessors time and resources.

An encryption processor for performing accelerated computations to establish secure network sessions is therefore needed.

SUMMARY OF THE INVENTION

The present invention relates to an encryption processor for performing accelerated computations to establish secure network sessions. The encryption processor includes an execution unit and a decode unit. The execution unit is configured to execute Montgomery product and Montgomery square operations and including at least one adder and at least two multipliers. The decode unit is configured to determine if a Montgomery square operation or a Montgomery product operation needs to be performed and to issue the appropriate instructions so that certain multiply and/or addition operations are performed in parallel in the execution unit while performing either the Montgomery square operation or Montgomery product operation.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The encryption processor of the invention can be used in establishing secure network sessions for various applications and markets. Examples of specific application areas are the follows: Secure web servers deploying Secure Socket Layer (SSL)/Transport Layer Security(TLS); Secure web switches deploying SSL/TLS; Internet load balancers with SSL/TLS termination functionality; Internet appliances for Virtual Private Network (VPN) or/and E-commerce applications; Router-based security and VPN support for enterprise and ISPs; Remote access devices for VPN application; Concentrator-based security for enterprise and ISPs; Subscriber management systems with VPN support; Firewalls with VPN support; and VPN gateways. For the sake of simplicity, the details of the encryption processor are described in relation to establishing an SSL connection between a client and server. As will be apparent to those skilled in the art, the encryption processor described below can be used in all of the other applications and markets described above.

Figure 1A:
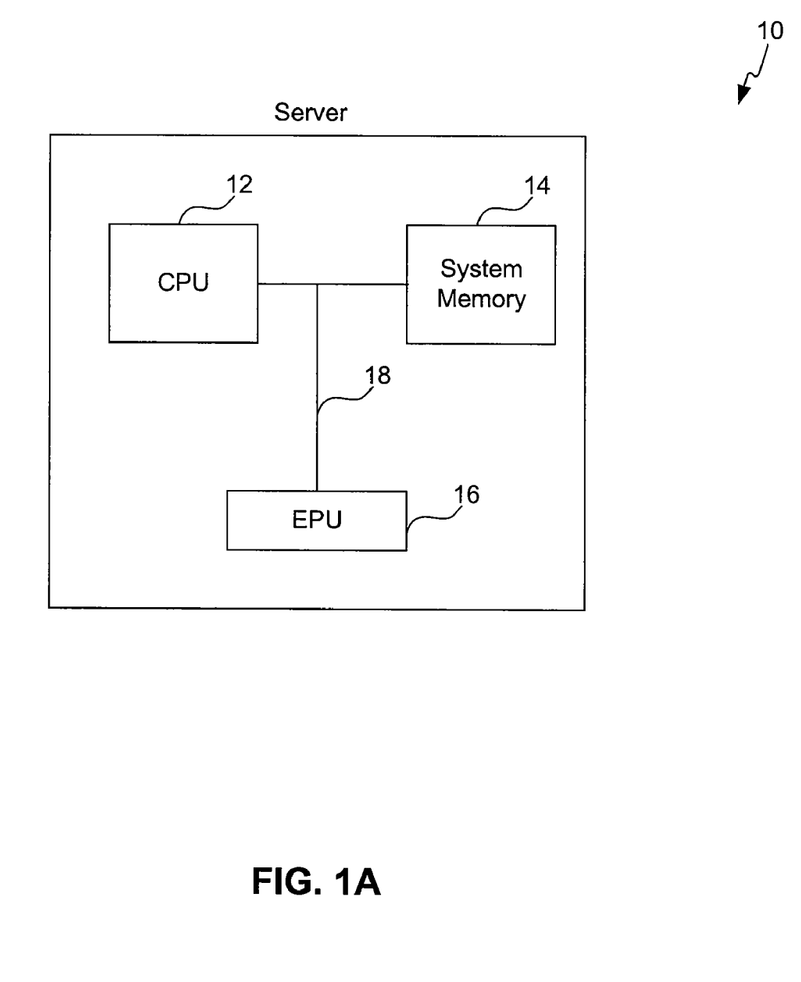
FIG. 1A through 1C are block diagrams of servers using the encryption processor according to several embodiments of the present invention.

Referring to FIG. 1A, a block diagram of a server using an encryption processor according to one embodiment of the present invention is shown. The server 10 includes a central processing unit (CPU) 12 including one or more microprocessors (not shown), a system memory 14, and an encryption processing unit (EPU) 16 coupled to the CPU 12 and the system memory 14 through a system bus 18. According to one embodiment of the invention, the system bus 18 is a PCI bus and a bridge chip (not shown) is used to couple the CPU 12 to the system memory 14 and the EPU 16). According to other embodiments of the invention, any type of other system bus can be used.

Figure 1B:
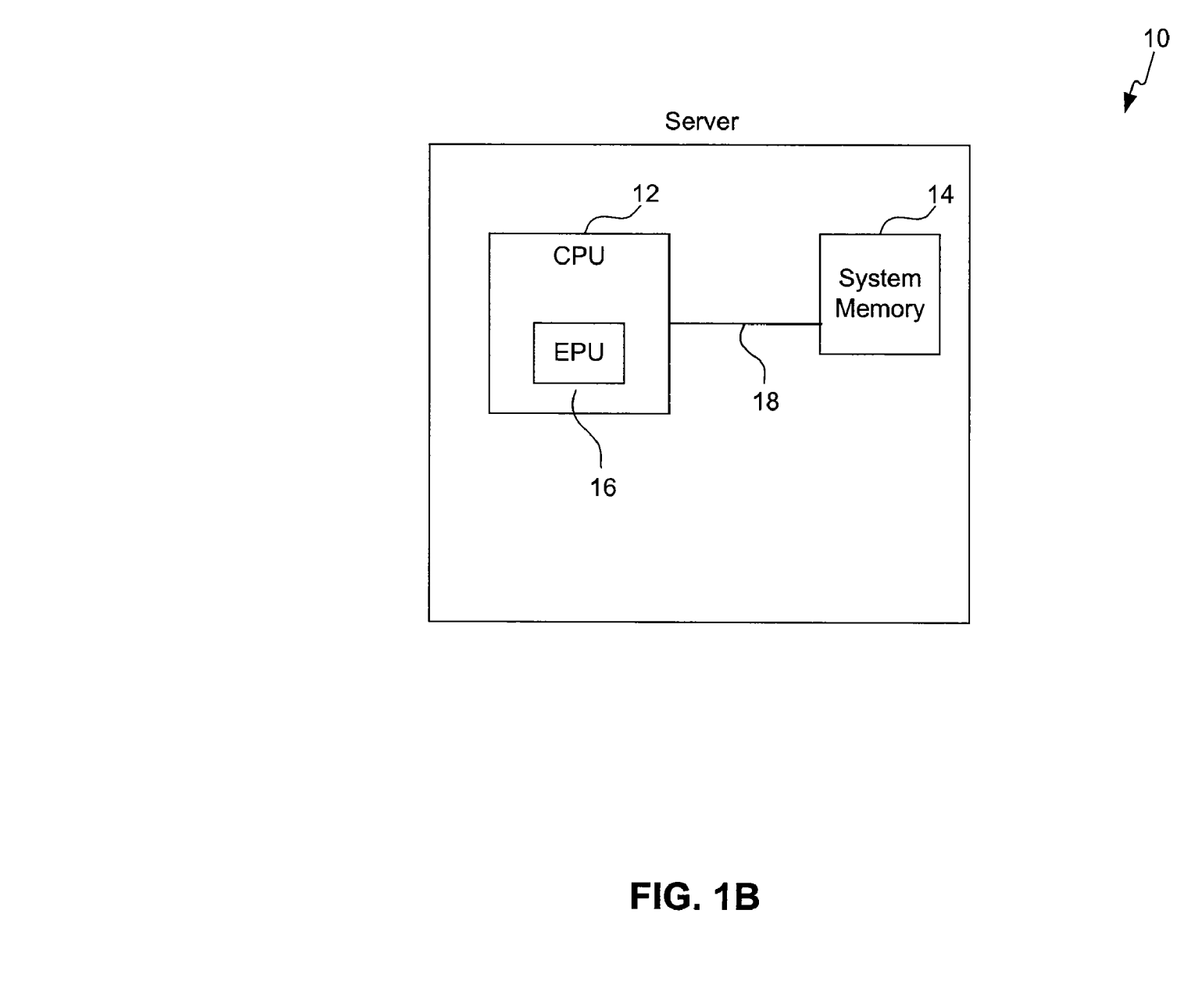

Referring to FIG. 1B, a block diagram of a server using an encryption processor according to another embodiment of the present invention is shown. The server 10 includes a central processing unit (CPU) 12 including one or more microprocessors (not shown), a system memory 14, and an EPU 16 embedded in the CPU 12. With this embodiment, the EPU is located on one of the microprocessors contained in the CPU 12. With this arrangement, the CPU 12 can communicate directly with the EPU 16 on the same chip without the use of a system bus.

Figure 1C:
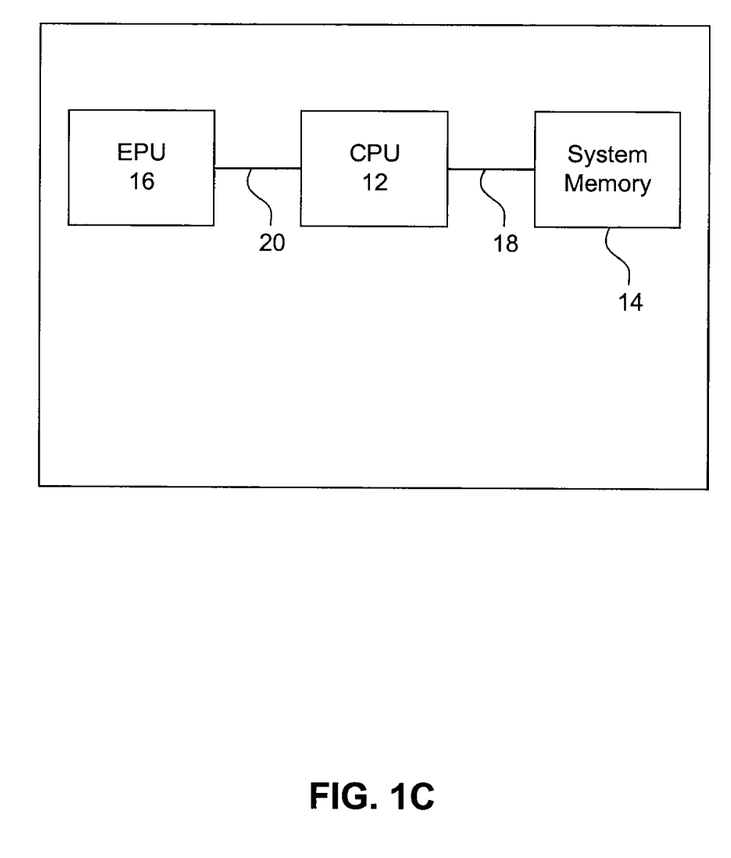

Referring to FIG. 1C, a block diagram of a server using an encryption processor according to another embodiment of the present invention is shown. The server 10 includes a central processing unit (CPU) 12 including one or more microprocessors (not shown), a system memory 14 coupled to the CPU 12 through a system bus 18, and an EPU 16 coupled to the CPU 12 through a dedicated bus 20. With this arrangement, the CPU 12 and the EPU 16 can directly communicate with one another over the dedicated bus 20 without the use of the system bus 18.

With each of the embodiments, the EPU 16 is a dedicated processor used for performing accelerated computations to secure network sessions between clients and the server 10. When a request for a SSL connection is made to the server 10, it is off-loaded to the EPU 16. With each request, the EPU 16 obtains the values modulus N, private key d and cipher text C sent by the client from system memory 14 and calculates the value of clear text M to establish the session. In this manner, the CPU 12 is relieved of this overhead and can therefore work on other processing tasks. In alternative embodiments, the EPU 16 can also obtain the values of N, d and C from the CPU 12 when in a master-slave mode.

Figure 2:
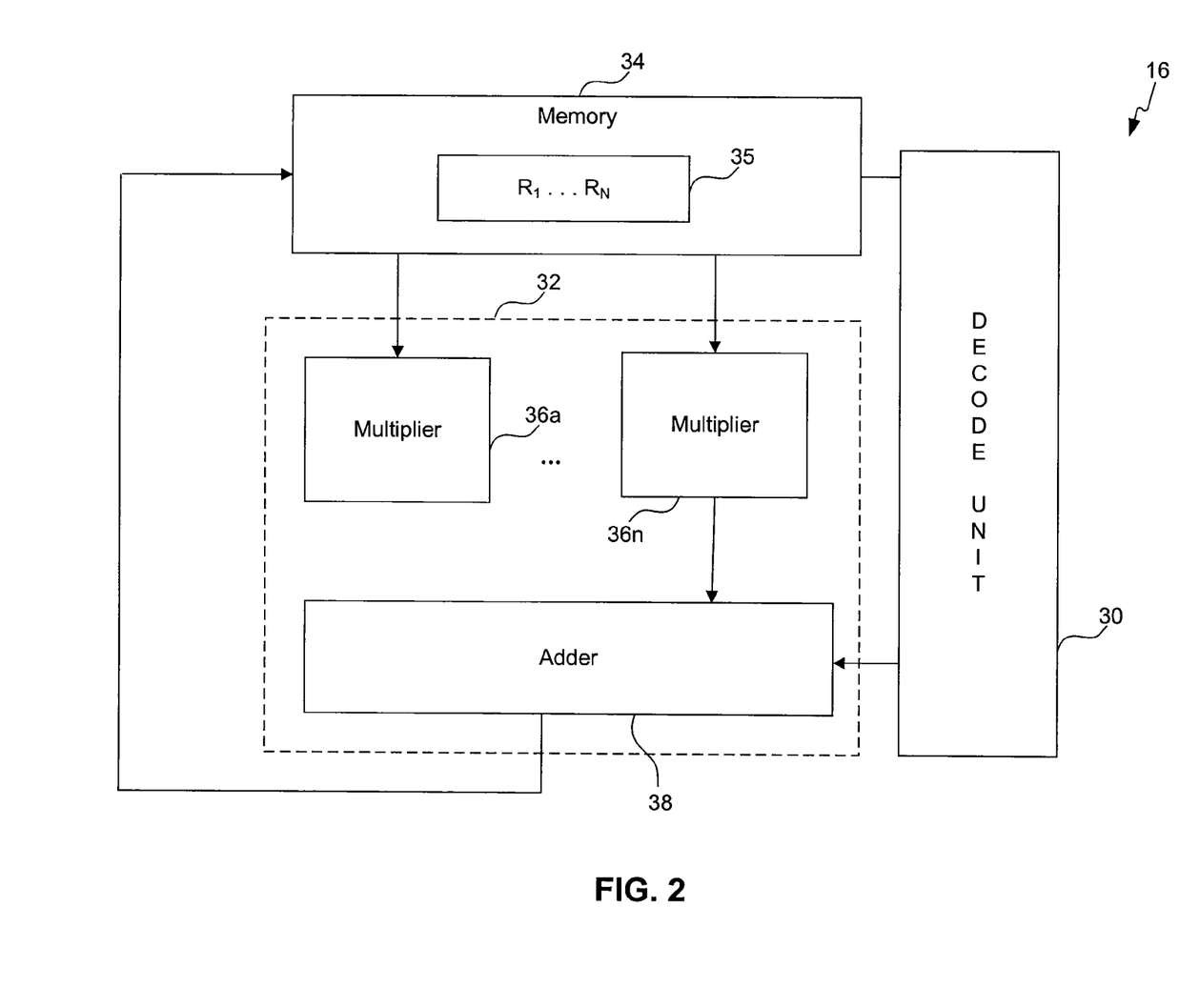
FIG. 2 is a block diagram of the encryption processor according to one embodiment of the present invention.

FIG. 2 is a block diagram of the encryption processor unit according to one embodiment of the present invention. The EPU 16 includes a decode unit 30, an execution unit 32, and a memory 35. The memory 34 contains a register set 35 which includes registers R1 through Rn. The execution unit 32 includes a plurality of multiplier units 36a through 36n and an adder 38. During operation, the decode unit 30 receives a request for establishing an SSL session from a client. When this occurs, the decode unit 30 fetches the values N, d, and C from system memory 14 and issues the appropriate microinstructions so that the M can be computed in the execution unit 32.

With modular math, M in the equation $M = C^d \bmod N$ is calculated by scanning the Most Significant Bit (MSB) positions of the exponent (d) and determining the first bit position equal to a first logic state (i.e., "1"). With this bit position, both a square $A*A \bmod N$ and product $A*B \bmod N$ is performed. Subsequently for the remaining bit positions to the Least Significant bit (LSB), either only a square operation $A*A \bmod N$ is performed if the bit position is of a second logic state (i.e., logic "0") or both a square $A*A \bmod N$ and product $A*B \bmod N$ operations are performed if the bit position is of the first logic state. For example, with each bit position (n) after the MSB equal to the first logic state, the following operations are performed:

| If d(n) = 0, then | B = (A*A) mod N; and |
|---|---|
| If d(n) = 1, then | C = (B*B) mod N |
| | E = (D*C) mod N. |

This sequence is repeated for all subsequent bit positions in the exponent (d) after the MSB position equal to the first state to the LSB. Since the result of each bit position of the exponent (d) is cumulative, the final value of mod N is computed after the LSB calculation is performed.

Therefore the decode unit 30 performs the following for each bit position of the exponent (d) from the first bit position equal to the first logic state to the LSB:

(a.1) the decode unit 30 issues a first set of instructions to the execution unit 32 so that the execution unit 32 can perform a Montgomerey square operation on the operands; and if (d=1), then:

(a.2) the decode unit 30 issues a second set of instructions to the execution unit 32 so that the execution unit 32 can perform a Montgomerey product operation on the operands; and.

(b) calculating the final result of M by accumulating the result of each iteration of the above for each bit position in the exponent (d) from the MSB to the LSB.

The instruction set used by decode unit 30 includes instructions that reduce the time required to perform the Montgomery square and Montgomery product operations. This is accomplished with specific instructions that introduce a high degree of parallelism. More specifically, these instructions cause either multiple multiplication operations to be performed simultaneously using multiplication units 34a through 34n and/or multiplication operations to be performed simultaneously with add operations using adder 38. As a result, the number of clock cycles required to complete either the Montgomery square or the Montgomery product is reduced. Since the equation $M = C^d \bmod N$ is so computation intensive, particularly with C and d values being 1024 bits wide, the benefits of the reduced number of cycles per iteration reduces the overall time required to establish an SSL connection. To best illustrate the operation of these instructions, several examples are provided below.

Figure 3:
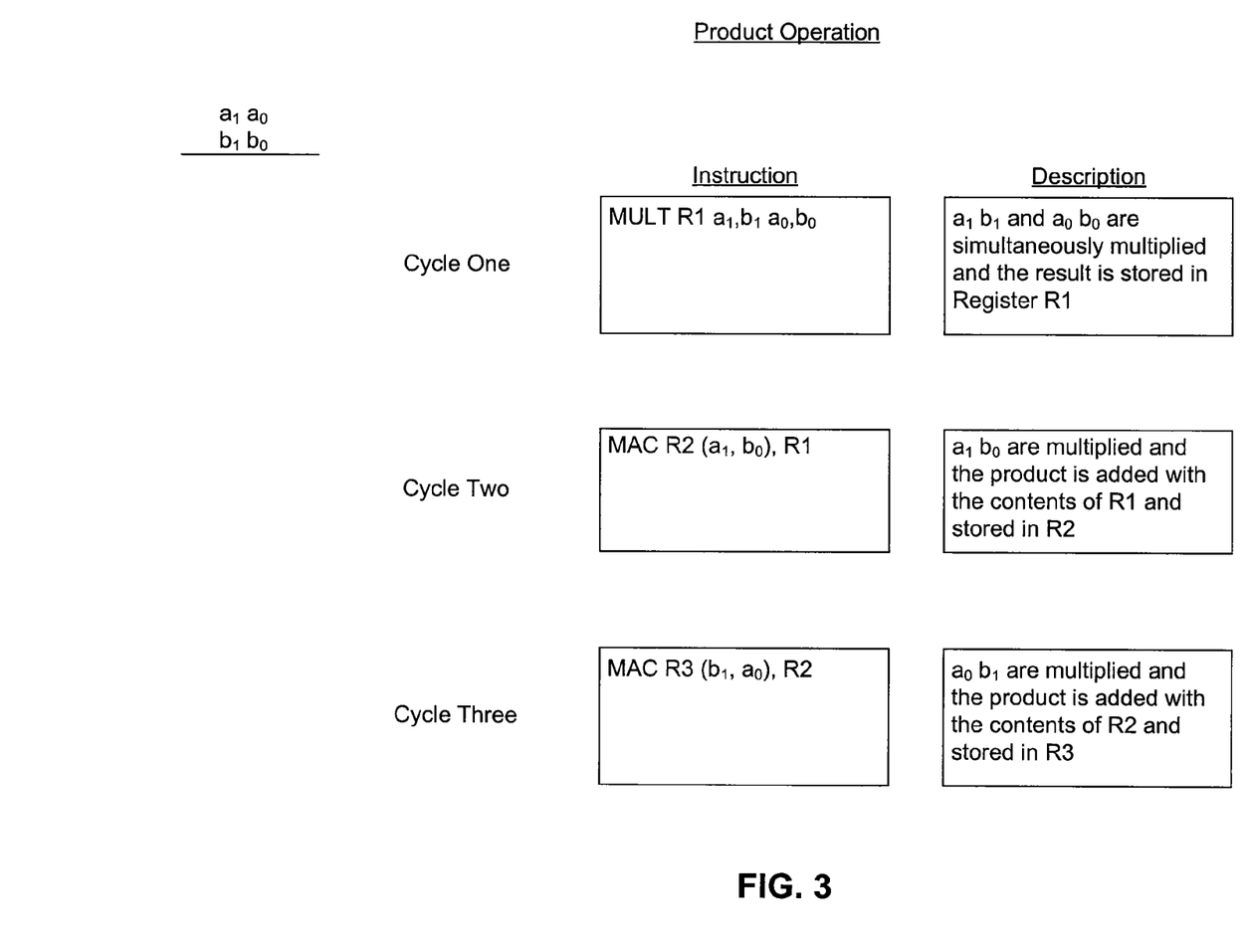
FIG. 3 is a diagram illustrating the cycles used to execute a product operation.

FIG. 3 is a diagram illustrating the cycles used to execute a product operation in an implementation of the encryption processor of the present invention having two multipliers and one adder. Consider the product of the operands (a1, a0) and (b1, b0). In the first cycle, the decode unit 30 issues an instruction (Mult R1 a1,b1 a0,b0). With this instruction, the (a1, b1) and (a0, b0) are simultaneously multiplied using multipliers 36a and 36b respectively. The results of the instruction are then stored in a Register R1. In the second cycle, the decode unit 30 issues another multiplication-add-carry instruction MAC R2 (a1, b0), R1. With this instruction, a1 and b0 are multiplied and the product is added to the contents of R1 and stored in R2. In the third cycle, the decode unit 30 issues another multiply-add-carry instruction MAC R3 (b1, a0) R2. With this instruction, b1 and a0 are multiplied and the product is added to the content of R2 and the result is stored in R3. The product operation is thus executed in three cycles. If this operation was executed in a typical processor, it would have likely required many more clock cycles. For example, the multiplications (a0, b0), (a1, b0), (a0, b1), and (a1, b1) would likely be performed sequentially followed by a series of additions of the intermediate multiplication results to complete the execution of this operation.

Figure 4:
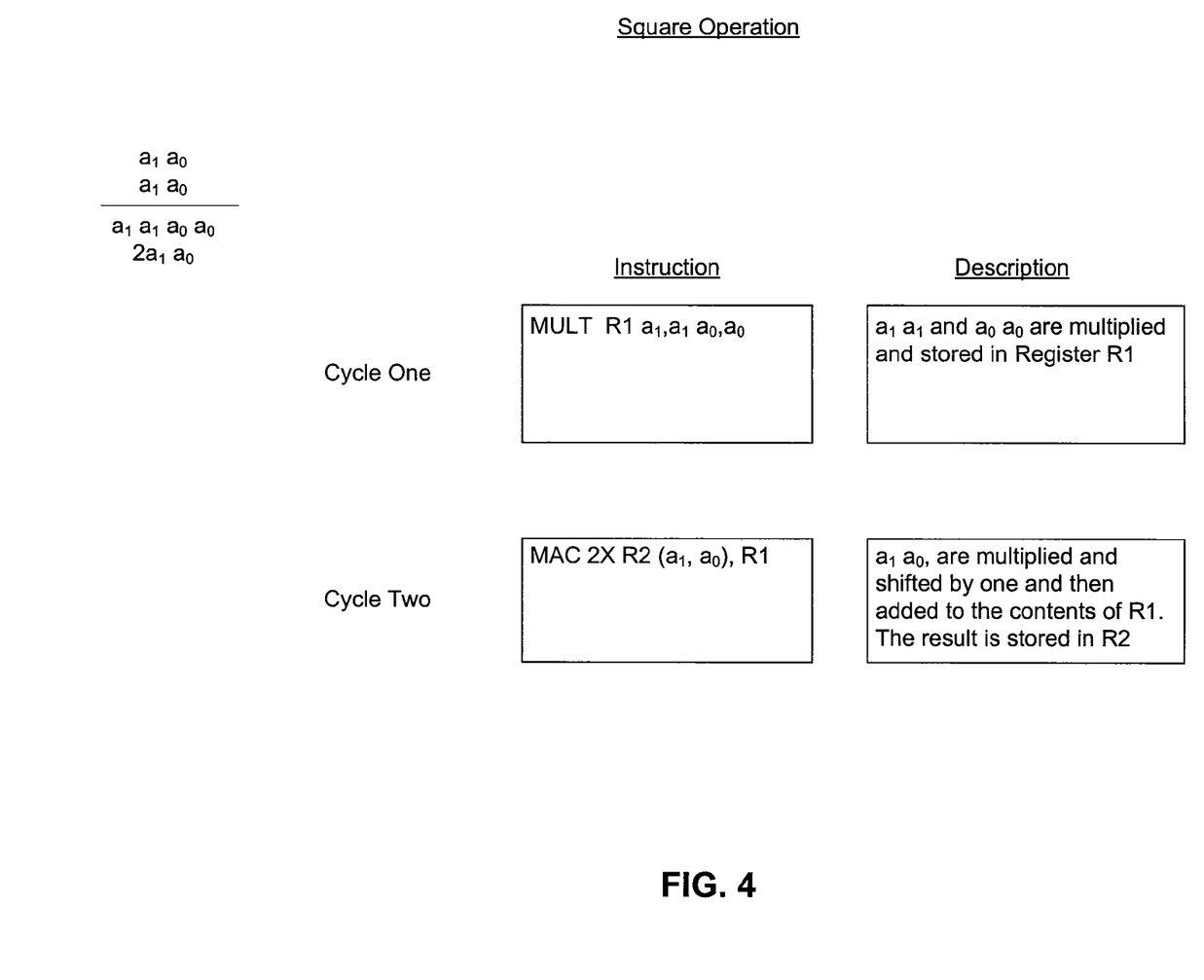
FIG. 4 is a diagram illustrating the cycles used to execute a square operation.

FIG. 4 is a diagram illustrating the cycles used to execute a square operation. Consider the square of the operand (a1, a0). In the first cycle, the decode unit 30 issues an instruction (Mult R1 a1,a1 a0,a0). With this instruction, the (a1,a1) and (a0,a0) are simultaneously multiplied using multipliers 36a and 36b respectively. The results of the instruction are then stored in a Register R1. In the second cycle, the decode unit 30 issues a multiply-add-carry-shift instruction: MAC 2X R2 (a1, a0), R1. With this instruction, (a1 and a0) are multiplied, the product is shifted left by one, and then added with the contents of R1. The result is stored in R2. With binary math, a shift left by one is a 2× multiplication. Accordingly the square operation is executed in two cycles. If this operation was executed in a typical processor, it would have likely required many more clock cycles. For example, the multiplications (a0, a0), (a1, a0), (a0, a1), and (a1, a1) would have been performed sequentially followed by a series of addition operations of the intermediate results of each multiplication to complete the execution of this operation.

Figure 5:
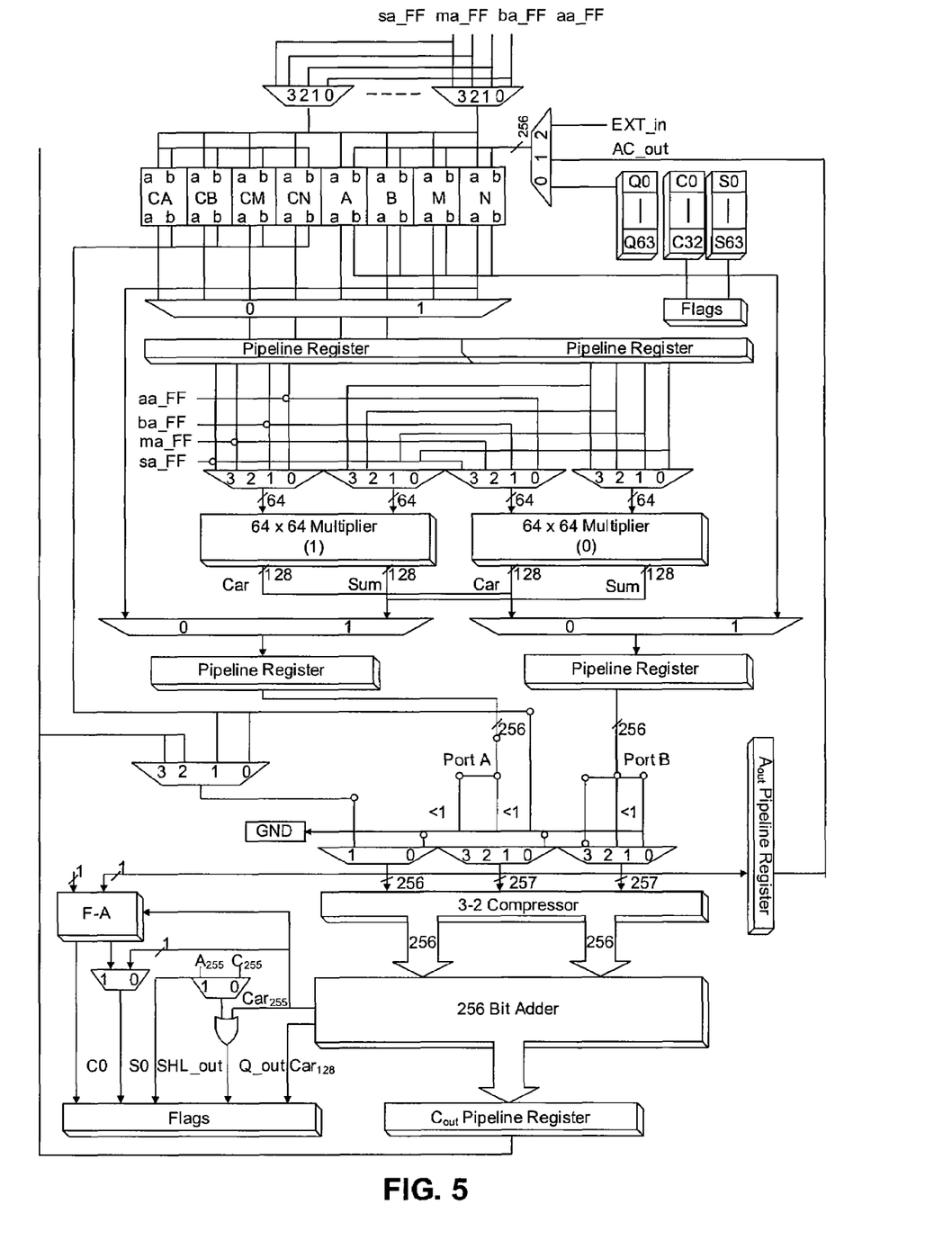
FIG. 5 is a detailed block diagram of the execution unit of the encryption processor according to one embodiment of the present invention.

FIG. 5 is a detailed block diagram of the execution unit of the encryption processor according to one embodiment of the present invention. The execution unit of this embodiment includes two 64×64 multipliers, a 256-bit partition adder, and register banks Ra, Rb, Rm and Rn. This execution can support Add, Subtract, Multiply, MAC, Logical and Move instructions on 64, 128 and 256 bit unsigned operands. Table I below shows a summary of all the instructions executed by this unit. The execution unit is controlled by the decode unit 30. In one embodiment, the instruction micro sequence is stored in memory in the decode unit 30. In an alternative embodiment, the control logic is hardwired in the decode unit 30. In either embodiment, the decode unit generates control signals to control the operation of the execution unit and the operands are passed from the memory 34 to the execution unit through the register banks Ra, Rb, Rm and Rn. The results of the operation are stored in Register Rcout registers and carries are stored in bit addressable register.

The 64×64 multipliers are used to perform the multiply and MAC operations. These multipliers are used in the first pipeline stage and produce the result in Sum and Carry form. The Sum and Carry vectors produced by the two multipliers are added in the second pipeline stage using a 256-bit Carry Propagate Adder (CPA). In the second pipeline stage a 3×2 compressor is used to add the third operand in case of MAC operation, while multiplexers are used to perform the selection and inversion of inputs for the Addition and Subtraction. Pipeline registers are provided to temporarily store operands to the multipliers and the adder. In one embodiment, the width of the adder operand register is equal to the sum of the widths of the two multiplier result registers.

Instruction Execution

Instructions executed by the processor of FIG. 5 can be classified into two categories, add-subtract and multiply. A brief description of the instructions listed in Table I is provided below.

Add-Subtract Instructions

All the Add-Subtract Instructions operate on 128 and 256 bit operands. The inputs are provided using 64-bit source operand registers Ra, Rb, Rm, and Rn, and the result is stored in Rc. In case of 128 or 256-bit operation, Ra, Rb, Rm, and Rn are concatenated to form 128 and 256-bit operands. The execution unit also supports predicated Subtract operation to support restoring division algorithm needed for Montgomery reduction operation.

ADD/SUB Instruction

The ADD(SUB) instruction performs the addition (subtraction) of two operands with carry generation. The input operands are stored in the Ra, Rb, Rm, and Rn registers aligned at 256 bits and result is written back in Rc register.

ADDC Instruction

In order to add the carries generated during multiplication execute unit supports ADCC (addition of carries). The instruction is similar to ADD instruction the only difference is that this instruction adds the carries (padded with zeros) at 64-bit boundaries with the 256-bit operand. The advantage of this instruction is that it can add 7 carries produced at 64-bit boundaries in a single cycle. The carries are added using the third input of the 3-2 Compressor of the second pipeline stage.

SUB2X Instruction

The SUB2X instruction performs the subtraction of two operands with one operand shifted by one bit. This operation generates the carry and shifted bit of the input operand to get the 1-bit quotient in Divide operation. The input operands are stored in the Ra, Rb, Rm, and Rn registers. The result and one bit shifted operand is written back to Rc and the operand register respectively. This instruction operates on only 256-bit operands.

SUB2XP Instruction

The SUB2XP instruction performs the predicted subtraction of two operands with one operand shifted by one bit. This operation is required to support Restoring Division. This operation generates the carry and shifted bit of the input operand to get the 1-bit quotient in Divide operation. Based on the quotient bit produced in iteration i-1 (if i is the current iteration), input for the subtractor is selected. If the quotient bit is one then the original input (Dividend stored in Ra, Rb, Rn or Rm) is selected else the result (remainder) of the previous iteration is selected.

Multiply Instructions

The MUL (MUL2) instruction performs the simultaneous multiplication of four 64-bit operands with carry generation. The MUL2 instruction performs the multiplication of source operands Ra, Rb, Rm, Rn, and then shifts the result by one bit to perform multiplication by 2. In order to preserve the result after multiply by two, a full adder has been used after the 256-bit carry-propagate-adder. This full adder adds the shifted left MSB bit and the carry out of the 256-bit adder to produce the $257^{th}$ bit carry-out signal in case of multiplication by 2. MUL (MUL2) instruction completes in three cycles with single cycle throughput. The input operands are stored in the Ra, Rb, Rm, and Rn registers and result is written back in Rc register.

MAC/MACc Instruction

The MAC/MACc instructions perform the multiplication of source operands Ra, Rb, Rm, Rn and the addition of target register Rc. MAC instruction adds one carry with the result, while MACc adds two carries with the result, the address of the carries is specified in the instruction opcode. These instructions complete in two cycles with single cycle throughput. The input operands are stored in the Ra, Rb, Rm, and Rn registers and result is written back in Rc register.

MAC2/MAC22/MAC2c/MAC22c Instruction

The MAC2x instructions perform the multiplication of source operands Ra, Rb, Rm, Rn, and then shifts the result by one bit to perform multiplication by 2 and finally add the result with the target register Rc. The only difference between MAC2 and MAC22 is that; in MAC2 the whole 256-bit result is shifted by 1-bit while in MAC22 only the most significant 128 bits are shifted left. In order to preserve the result after multiply by two, a full adder has been used after the 256-bit carry propagate adder. This full adder adds the shifted left MSB bit and the carry out of the 256-bit adder to produce the $257^{th}$ bit and carry-out signal in case of multiplication by 2. MAC2 instruction adds one carry with the result, while MAC2c adds two carries with the result, the address of the carries is specified in the instruction opcode. These instructions complete in two cycles with single cycle throughput. The input operands are stored in the Ra, Rb, Rm, and Rn registers and result is written back in Rc register.

TABLE I

Instructions supported by the Execution Unit, ‖ is the concatenation operator, Ci is the input carry, Co is the output carry, and OCx is the carry concatenated with '0'.

| Inst. | Operation | Result | Input Operands | Output |
|---|---|---|---|---|
| MUL | Ra[1] × Rb[1]‖Ra[0] × Rb[0] | Rc[3:0] | 64 ‖ 64 | 256 |
| MUL2 | 2(Ra[1] × Rb[1]‖Ra[0] × Rb[0]) | CoSoRc[3:0] | 64 ‖ 64 | 256 (1 bit Cout, & Sout) |
| MAC | (Ra[1] × Rb[1]‖Ra[0] × Rb[0]) + (Rd[3:0]) + (Ci) | CoRc[3:0] | (64 × 64‖64 × 64) + (64‖64‖64‖64) + Ci | 256 (1 bit Cout) |
| MACc | (Ra[1] × Rb[1]‖Ra[0] × Rb[0]) + (Ci0) + (Rd[3:0]) + (Ci1) | CoRc[3:0] | (64 × 64‖64 × 64) + Ci0 + (64‖64‖64‖64) + Ci1 | 256 (1 bit Cout) |
| MAC2 | (2(Ra[1] × Rb[1]‖Ra[0] × Rb[0])) + (Rd[3:0]) + (Ci) | CoSoRc[3:0] | 2(64 × 64‖64 × 64) + (64‖64‖64‖64) + Ci | 256 (1 bit Cout, & Sout) |
| MAC2c | (2(Ra[1] × Rb[1]‖Ra[0] × Rb[0])) + (Ci0) + (Rd[3:0]) + (Ci1) | CoSoRc[3:0] | 2(64 × 64‖64 × 64) + Ci1 + (64‖64 ‖ 64‖64) + Ci0 | 256 (1 bit Cout, & Sout) |
| MAC22 | (2(Ra[1] × Rb[1]))‖(Ra[0] × Rb[0]) + (Rd[3:0]) + (Ci) | CoSoRc[3:0] | (2(64 × 64))‖(64 × 64) + (64‖64‖64‖64) + Ci | 256 (1 bit Cout, & Sout) |
| MAC22c | (2(Ra[1] × Rb[1]))‖(Ra[0] × Rb[0]) + (Ci0) + (Rd[3:0]) + (Ci1) | CoSoRc[3:0] | (2(64 × 64))‖(64 × 64) + Ci1 + (64‖64‖64‖64) + Ci0 | 256 (1 bit Cout, & Sout) |
| ADD | Ra[3]Ra[2]Ra[1]Ra[0] + Rb[3]Rb[2]Rb[1]Rb[0] | CoRc[3:0] | 256, 128 | 256,128 (1 bit carry) |
| ADDC | Ra[3]Ra[2]Ra[1]Ra[0] + 0C3 0C2 0C1 0C0 | CoRc[3:0] | 256, 128 | 256, 128 (1 bit carry) |
| SUB | Ra[3]Ra[2]Ra[1]Ra[0] − Rb[3]Rb[2]Rb[1]Rb[0] | CoRc[3:0] | 256, 128 | 256, 128 (1 bit carry/sign) |
| SUB2X | (Ra[3]Ra[2]Ra[1]Ra[0]) < 1 − (Rb[3]Rb[2]Rb[1]Rb[0]) | CoRc[3:0] & Sign out | 256 | 256 (1 bit carry, & MSB as sign bit) |
| SUB2xP | <1[(Ra[3]Ra[2]Ra[1]Ra[0]) or (Rd[3]Rd[2]Rd[1]Rd[0])] − (Rb[3]Rb[2]Rb[1]Rb[0]) | CoRc[3:0] & Sign out | 256 | 256 (1 bit carry, & MSB as sign bit) |
| SHL | | CoRc[3:0] | 256 | 256 (1 bit MSB as sign bit) |
| MOV | (Rc[3]Rc[2]Rc[1]Rc[0]) <− (Ra[3]Ra[2]Ra[1]Ra[0]) | Rc[3:0] | 256, 64 | 256, 64 |
| MOV_EXT | (Rn[0]Rm[0]Rb[0]Ra[0]) <− EXT | Rn, Rm, Rb, Ra | 256 | 256 |
| MOV_Q | Ra[0] <− Q | Ra | 64 | 64 |

Modular Computation Examples

For a given process technology, if an n-bit optimized multiplier can be built so that it can generate 2n-bit multiplication result every cycle, the execution unit can be built with m n-bit multipliers with one 2*m*n-bit adder. It can also be built with m/2 4n-bit adder (for even number m). For example, if an execution unit can be built with two 64-bit multipliers and one 256-bit adder using current process technology, it can be built with four 64-bit multipliers and one 512-bit adder or two 128-bit multipliers and one 512-bit adder and so on in subsequent process technology generations. The larger the width of the multipliers and adder, the fewer the number of microinstructions are needed to complete a modular exponentiation operation.

For a given large number A(256, 512, 768, 1024, 1536, 2048, 4096-bit, etc.), it can be expressed as $A=a_k*(2^n)^k+a_{k-1}*(2^n)^{k-1}+\ldots+a_1*(2^n)+a_0$, where n is the length of operands of the multipliers in the execution unit in base 2. Multi-precision multiplication of A and B is $$A*B=[a_k*(2^n)^k+a_{k-1}*(2^n)^{k-1}+\ldots+a_1*(2^n)+a_0]*[b_k*(2^n)^k+k_{k-1}*(2^n)^{k-1}+\ldots+b_1*(2^n)+b_0]$$

For an execution unit with two n-bit multipliers and one 4n-bit adder, the sequence of cycle-by-cycle executions of the multiplication is the follows:

```
                                            a1b1‖a0b0
                                            a2b1‖a0b1
                                            a1b2‖a1b0
                                            a1b3‖a0b2
                                            a3b1‖a2b0
                                            a1b4‖a0b3
                                            a4b1‖a3b0
                                            a1b5‖a0b4
                                            a5b1‖a4b0
                                            a3b3‖a2b2
                                            a1b6‖a0b5
                                            a6b1‖a5b0
                                            a2b5‖a2b3
                                            a5b2‖a3b2
                                                  .
                                                  .
                                                  .
             a_{k-1}b_k‖a_{k-1}b_{k-3}
                a_k b_{k-1}‖a_{k-3}b_{k-1}
             a_k b_k‖a_{k-1}b_{k-1}
``` where $a_i b_j \| a_p b_q$, $0 < i, j <= k$ and $0 <= p, q < k$, represents that the result of $a_i * b_j$ performed in one multiplier unit is concatenated with the result of $a_p * b_q$ performed in the second multiplier unit. The indentation represents the shift of length n, the size of operands of the multipliers. Two numbers with the same indentation is added with all the bits in the numbers used. When two numbers across the different indentations is added, the lowest n-bits of the first number would be shifted out before adding, i.e. only the highest 3n-bits plus carry from the first number are used in addition. The n bits shifted out become the result of multiplication for those corresponding bit positions. The decode unit is capable issuing multiply-and-add instruction so that the multiplication followed by addition operation can be performed for the multi-precision arithmetic.

An example of 512×512 bit multiplication using the instructions in the disclosure for an implementation of the execution unit of two 64-bit multipliers and one 256-bit adder is shown in Table II below:

TABLE II

Micro instruction sequence for 512 × 512 Multiplication of a7a6a5a4a3a2a1a0 by b7b6b5b4b3b2b1b0.

| Cyc. | Instruction | Operation |
|---|---|---|
| 1. | MUL Rc[3:0], Ra[0]Rb[2], Ra[0]Rb[0] | a0b2a0b0 |
| 2. | MAC C01Rc[4:1], Ra[0]Rb[3], Ra[0]Rb[1], Rc[3]Rc[2]Rc[1]R0[0]C0 | a0b3a0b1 |
| 3. | MAC C02Rc[4:1], Ra[1]Rb[2], Ra[1]Rb[0], Rc[4]Rc[3]Rc[2]Rc[1]C0 | a1b2a1b0 |
| 4. | MAC C03Rc[5:2], Ra[0]Rb[4], Ra[1]Rb[1], R0[0]Rc[4]Rc[3]Rc[2]C0 | a0b4a1b1 |
| 5. | MAC C04Rc[5:2], Ra[1]Rb[3], Ra[2]Rb[0], Rc[5]Rc[4]Rc[3]Rc[2]C0 | a1b3a2b0 |
| 6. | MAC C05Rc[6:3], Ra[0]Rb[5], Ra[2]Rb[1], R0[0]Rc[5]Rc[4]Rc[3]C0 | a0b5a2b1 |
| 7. | MAC C06Rc[6:3], Ra[1]Rb[4], Ra[3]Rb[0], Rc[6]Rc[5]Rc[4]Rc[3]C0 | a1b4a3b0 |
| 8. | MAC C07Rc[7:4], Ra[0]Rb[6], Ra[2]Rb[2], R0[0]Rc[6]Rc[5]Rc[4]C0 | a0b6a2b2 |
| 9. | MAC C08Rc[7:4], Ra[1]Rb[5], Ra[3]Rb[1], Rc[7]Rc[6]Rc[5]Rc[4]C0 | a1b5a3b1 |
| 10. | MAC C09Rc[7:4], Ra[2]Rb[4], Ra[4]Rb[0], Rc[7]Rc[6]Rc[5]Rc[4]C0 | a2b4a4b0 |
| 11. | MAC C10Rc[8:5], Ra[0]Rb[7], Ra[2]Rb[3], R0[0]Rc[7]Rc[6]Rc[5]C01 | a0b7a2b3 |
| 12. | MAC C11Rc[8:5], Ra[1]Rb[6], Ra[3]Rb[2], Rc[8]Rc[7]Rc[6]Rc[5]C02 | a1b6a3b2 |
| 13. | MAC C12Rc[8:5], Ra[2]Rb[5], Ra[4]Rb[1], Rc[8]Rc[7]Rc[6]Rc[5]C0 | a2b5a4b1 |
| 14. | MAC C13Rc[8:5], Ra[3]Rb[4], Ra[5]Rb[0], Rc[8]Rc[7]Rc[6]Rc[5]C0 | a3b4a5b0 |
| 15. | MAC C14Rc[9:6], Ra[1]Rb[7], Ra[3]Rb[3], R0[0]Rc[8]Rc[7]Rc[6]C03 | a1b7a3b3 |
| 16. | MAC C15Rc[9:6], Ra[2]Rb[6], Ra[4]Rb[2], Rc[9]Rc[8]Rc[7]Rc[6]C04 | a2b6a4b2 |
| 17. | MAC C16Rc[9:6], Ra[2]Rb[6], Ra[4]Rb[2], Rc[9]Rc[8]Rc[7]Rc[6]C0 | a3b5a5b1 |
| 18. | MAC C17Rc[9:6], Ra[4]Rb[4], Ra[6]Rb[0], Rc[9]Rc[8]Rc[7]Rc[6]C0 | a4b4a6b0 |
| 19. | MAC C18Rc[10:7], Ra[2]Rb[7], Ra[4]Rb[3], R0[0]Rc[9]Rc[8]Rc[7]C05 | a2b7a4b3 |
| 20. | MAC C19Rc[10:7], Ra[3]Rb[6], Ra[5]Rb[2], Rc[10]Rc[9]Rc[8]Rc[7]C06 | a3b6a5b2 |
| 21. | MAC C20Rc[10:7], Ra[4]Rb[5], Ra[6]Rb[1], Rc[10]Rc[9]Rc[8]Rc[7]C0 | a4b5a6b1 |
| 22. | MAC C21Rc[10:7], Ra[5]Rb[4], Ra[7]Rb[0], Rc[10]Rc[9]Rc[8]Rc[7]C0 | a5b4a7b0 |
| 23. | MAC C22Rc[11:8], Ra[3]Rb[7], Ra[5]Rb[3], R0[0]Rc[10]Rc[9]Rc[8]C07 | a3b7a5b3 |
| 24. | MAC C23Rc[11:8], Ra[4]Rb[6], Ra[6]Rb[2], Rc[11]Rc[10]Rc[9]Rc[8]C08 | a4b6a6b2 |
| 25. | MAC C24Rc[11:8], Ra[5]Rb[5], Ra[7]Rb[1], Rc[11]Rc[10]Rc[9]Rc[8]C09 | a5b5a7b1 |
| 26. | MACc C25Rc[12:9], Ra[4]Rb[7], Ra[6]Rb[3], 0C22Rc[11]Rc[10]Rc[9]C10, C11 | a4b7a6b3 |
| 27. | MACc C26Rc[12:9], Ra[5]Rb[6], Ra[7]Rb[2], Rc[12]Rc[11]Rc[10]Rc[9]C12, C13 | a5b6a7b2 |
| 28. | MACc C27Rc[13:10], Ra[5]Rb[7], Ra[6]Rb[4], 0C25Rc[12]Rc[11]Rc[10]C14, C15 | a5b7a6b4 |
| 29. | MACc C28Rc[13:10], Ra[6]Rb[6], Ra[7]Rb[3], Rc[13]Rc[12]Rc[11]Rc[10]C16, C17 | a6b6a7b3 |
| 30. | MACc C29Rc[14:11], Ra[6]Rb[7], Ra[6]Rb[5], 0C27Rc[13]Rc[12]Rc[11]C18, C19 | a6b7a6b5 |
| 31. | MACc C30Rc[14:11], Ra[7]Rb[6], Ra[7]Rb[4], Rc[14]Rc[13]Rc[12]Rc[11]C20, C21 | a7b6a7b4 |
| 32. | MACc C31Rc[15:12], Ra[7]Rb[7], Ra[7]Rb[5], 0C29Rc[14]Rc[13]Rc[12]C23, C24 | a7b7a7b5 |
| 33. | ADD256 Rc[15:12], Rc[15:12], 0C30 0C28 0C26 0000 | Add carr |

For an implementation of two 256-bit multipliers and one 1024-bit adder for the same example (a1a0 * b1b0), we have the following instruction sequence:
- (a) multiplying (a1, b1) and (a0, b0) in parallel;
- (b) multiplying (a1,b0) and adding the product to the result of (a);
- (c) multiplying (b1,a0) and adding the product to the result of (b).

For square operations, further speed-up can be realized. All the $a_i b_j$ and $a_j b_i$ terms become $a_{i+j}$ and $(a_i b_j + a_j b_i)(2^n)^{(i+j)}$ becomes $2 a_{i+j}(2^n)^{(i+j)}$. Multiplication by 2 in binary system is equivalent to shift-left by 1. A special instruction with multiplication followed by shift left by 1 is included in the instruction set to enable this optimization.

For an execution unit with two n-bit multipliers and one 4n-bit adder, the sequence of cycle-by-cycle executions of the multiplication is the follows:

$$\begin{array}{r}
a1b1 \| a0a0 \\
2a2a1 \| 2a0a1 \\
2a1a3 \| 2a0a2 \\
2a1b4 \| 2a0b3 \\
2a1a5 \| 2a0a4 \\
a3b3 \| a2b2 \\
2a1a6 \| 2a0a5 \\
2a2a5 \| 2a2a3 \\
\vdots \\
2a_{k-1}a_k \| 2a_{k-1}a_{k-3} \\
a_k b_k \| a_{k-1}b_{k-1}
\end{array}$$

Compared to the case of multiplication, square operation with the special instruction reduces significant number of cycles. The example of an implementation of two 256-bit multipliers and one 1024-bit adder for 512×512 bit square has the following instruction sequence:
- (a) multiplying (a1, a1) and (a0, a0) in parallel;
- (b) multiplying (a1, a0) and shifting left by 1; and
- (c) adding the results of (a) and (c).

Thus the number of cycles needed to perform the 512×512 bit square sequence is reduced.

Although only a few embodiments of the present invention have been described, it should be understood that the present invention may be embodied in many other specific forms without departing from the spirit or the scope of the invention. For example, additional adders and multipliers can be included in the execution to increase throughput. Therefore, the present examples are to be considered as illustrative and not restrictive, and the invention is not to be limited to the details given herein, but may be modified within the scope of the appended claims.

What is claimed is:

1. A server, comprising:
   a system memory; and
   a processing unit coupled to said system memory via a system bus, said processing unit including:
   an execution unit, coupled to a decode unit, configured to execute arithmetic instructions to perform product and square operations, said execution unit including at least two multipliers connected directly with said system memory for multiplying data provided from said system memory, and at least one adder connected directly with said at least two multipliers for applying an addition operation to outputs of said at least two multipliers, said execution unit configurable to perform specified multiplication operations and specified multiplication and addition operations simultaneously relative to a clock cycle; and
   said decode unit being configured to determine if a square operation or a product operation needs to be performed on an operand, said decode unit being further configured to issue said arithmetic instructions to said execution unit so that said execution unit performs specified multiplication and addition operations and specified multiplication operations simultaneously relative to said clock cycle while performing either said square or product operation.

2. The server of claim 1, wherein certain of said multiplication operations are performed using a multiply and shift by one instruction.

3. The server of claim 1, wherein said decode unit is further configured to decode an operation $M=C^d \mod N$ by:
   (a) determining a most significant bit (MSB) position of an exponent d equal to a first logic state;
   (b) issuing a first set of instructions to implement a square and a product operation after said MSB position of said exponent d equal to said first logic state is determined;
   (c) determining if a next MSB of said exponent d is of said first logic state or a second logic state; and either
   (d) issuing a second set of instructions to said execution unit to implement a square operation if said next MSB is of said second logic state; or
   (e) issuing said first set of instructions to said execution unit if said next MSB said exponent d is of said first logic state to implement a square and a product operation; and
   (f) repeating (c) through (e) for every bit in said exponent d from said next MSB to a least significant bit (LSB).

4. The server of claim 3, wherein a final result of said operation $M=C^d \mod N$ is obtained by accumulating results of (b) through (e).

5. The server of claim 1, wherein said server is configured to establish a secure socket layer connection between said server and a client.

6. The server of claim 1 wherein said product and square operations executed by said execution unit include Montgomery product and square operations.

7. The server of claim 1, wherein said server is configured into a web server deploying Secure Socket Layer (SSL)/Transport Layer Security(TLS).

8. The server of claim 1, wherein said server is configured into a secure switch deploying Secure Socket Layer (SSL)/Transport Layer Security(TLS).

9. The server of claim 1, wherein said server is configured into an Internet load balance device with Secure Socket Layer (SSL)/Transport Layer Security(TLS) termination functionality.

10. The server of claim 1 wherein said server is configured into an Internet appliance for a Virtual Private Network.

11. The server of claim 1 wherein said server is configured into a security based router.

12. The server of claim 1 wherein said server is configured into a remote access device used for VPN applications.

13. The server of claim 1, wherein said server is configured into at least one of:
   a concentrator-based security system for enterprise and ISPs;
   a subscriber management system with VPN support;
   a firewall with VPN support; and
   a VPN gateway.

14. The server of claim 1, wherein said at least two multipliers and said at least one adder perform said specified multiplication in a first clock cycle.

15. The server of claim 14, wherein said at least two multipliers and said at least one adder perform said specified multiplication and addition operations in a second clock cycle that immediately follows said first clock cycle.

16. The server of claim 1, wherein said at least two multipliers and said at least one adder perform either specified multiplication operations or perform specified multiplication and addition operations in accordance with said arithmetic instructions.

17. The server of claim 1, wherein said decode unit determines whether a square operation or a product operation needs to be performed on an operand for a modular operation.

18. The server of claim 17, wherein said at least two multipliers and said at least one adder perform either specified multiplication operations or perform specified multiplication and addition operations in accordance with said determination of whether a square operation or a product operation needs to be performed.

19. The server of claim 1, wherein said arithmetic instructions comprise a set of micro instructions.

20. The server of claim 1, wherein said arithmetic instructions comprise plurality of types of add-subtract instructions and a plurality of types of multiply instructions.

21. The server of claim 1, wherein said processing unit obtains values for a modulus N, a private key d, and a cipher text C sent by a client.

22. The server of claim 21, wherein said processing unit calculates a value for clear text M for each request for a secure network session made to said server by said client.

23. The server of claim 1, wherein said value for clear text M is calculated using said Montgomery method.

24. The server of claim 1, wherein said decode unit is configured to receive requests for establishing a secure network session from a client.

* * * * *